April 28, 1925.
R. T. STRANGE, JR
1,535,266
STEERING ATTACHMENT FOR TRACTORS.
Filed Sept. 13, 1923
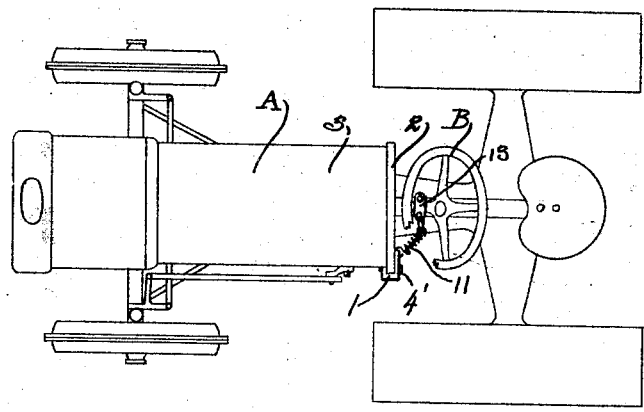
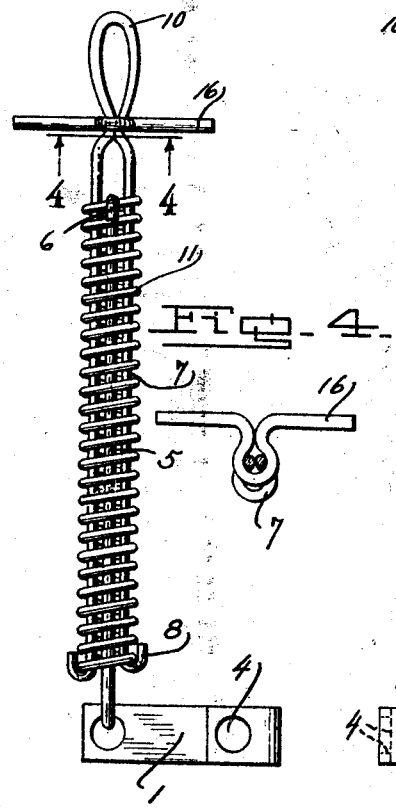
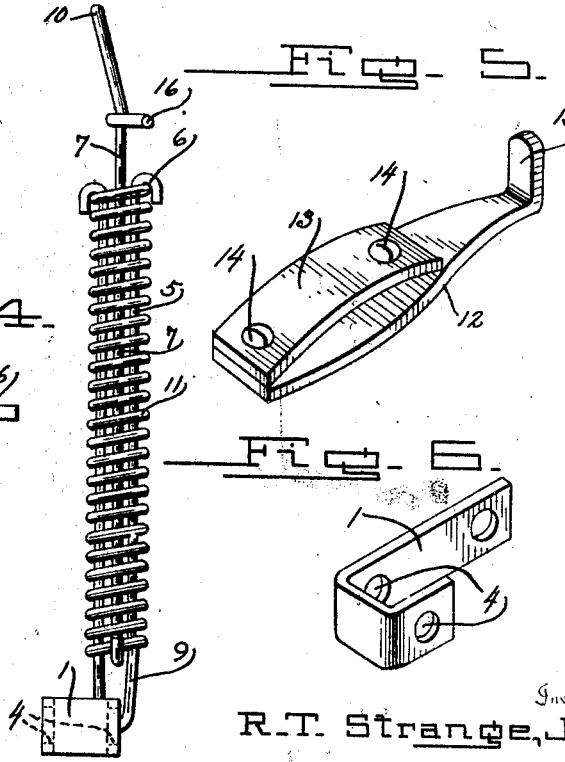
Inventor
R. T. Strange, Jr.
By Jacobi & Jacobi
Attorneys Patented Apr. 28, 1925.

1,535,266

UNITED STATES PATENT OFFICE.

RICHARD T. STRANGE, JR., OF ONARGA, ILLINOIS.

STEERING ATTACHMENT FOR TRACTORS.

Application filed September 13, 1923. Serial No. 662,506.

*To all whom it may concern:*

Be it known that I, RICHARD T. STRANGE, Jr., a citizen of the United States, residing at Onarga, in the county of Iroquois and State of Illinois, have invented certain new and useful Improvements in Steering Attachments for Tractors, of which the following is a specification.

This invention relates to a steering attachment and has for its principal object to provide a device which is especially adapted for use in connection with Fordson tractors to facilitate the steering of the tractor and keep the same in alinement with the furrow in which the forward wheel of the tractor is operated.

Another important object of the invention is to provide a steering attachment of the above mentioned character, which may be quickly and easily placed in an operative position for the purpose or controlling the steering of the tractor and will at all times assure the proper steering of the tractor when in use.

A still further object of the invention is to provide an attachment which may be easily attached in a convenient place upon the tractor and which will enable the operator to readily cause the same to be adjusted when desired to use the same and will thereby enable the operator to have the free use of his hand without the necessity of having to control the steering wheel while the tractor is in operation.

A still further object of the invention is to provide a steering attachment of the above mentioned character, which is simple in construction, inexpensive, strong, durable and further well adapted for the purpose for which it is designated.

Other objects and advantages of this invention will become apparent during the course of the following description.

In the accompanying drawing forming a part of this specification, and in which like numerals designate like parts throughout the same:—

Figure 1 is a plan view of a Fordson tractor showing my steering attachment in operative position thereon.

Figure 2 is a front elevation of the steering attachment.

Figure 3 is a side elevation thereof, and

Figure 4 is a section taken on line 4—4 of Fig. 2.

Figure 5 is a detail perspective of the hook or clamp member, and

Figure 6 is a detail perspective of the clamping bracket.

In the drawings wherein for the purpose of illustration is shown the preferred embodiment of my invention, the numeral 1 designates a clamp which has its lower end adapted to be secured to the bend 2 which extends around the fuel tank 3 of the tractor A and is held in position thereon by means of suitable fastening means adapted to extend through registering apertures 4 provided in the lower ends of the clamp as shown at 4 in the drawing. The upper end of the clamp 1 is provided with an aperture and is adapted to receive the crown portion or looped portion of an elongated U-shaped member designated generally by the number 5. The outer ends of the arms of the U-shaped member 5 are bent back upon themselves in the manner as more clearly shown in the drawings at 6 for the purpose to be hereinafter more fully described.

A second elongated U-shaped member 7 is adapted to cooperate with the U-shaped member 5 and has its arms extending between the arms of the U-shaped member 5 and its outer free end bent back upon itself as shown at 8 in the drawings and extending in close proximity to the looped portion 9 of the U-shaped member 5 which is secured to the upper end of the clamp 1. The looped portion 10 of the U-shaped member 7 extends beyond the bent portions 6 of the U-shaped member 5 and adapted to be disposed around the U-shaped members 4 and 7 respectively and between the hooked portions 6 and 8 thereof is the coil spring 11. The purpose of this construction will also be hereinafter more fully described.

Adapted to be detachably secured to one of the arms of the spider of the steering wheel B of the tractor is the hook 12. This hook 12 is provided with spaced apertures adjacent its large end and these apertures cooperate with similar spaced apertures provided in a plate 13 which is adapted to provide a means for enabling the large portion of the hook 12 to be supported on the aforesaid arm of the spider of the steering wheel B by means of suitable bolts 14 passing through the registering apertures provided in the upper end of the hook and the plate 13 as more clearly shown in the drawing. The hook portion 15 is adapted to detachably engage the looped portion 10 of the U-shaped member 7. The hook portion 15 being formed by bending the reduced free end of the hook 12 upwardly.

Looped around the U-shaped member 7 slightly above the hook portions 6 formed on the upper end of the arms of the U-shaped member 5 is the transversely extending rod 16. This rod 16 provides a handle whereby the U-shaped member 7 may be moved relative to the U-shaped member 5 and the clamp 1 carried thereby. It being understood that the portion of the U-shaped member 7 around which the rod 16 is looped converges so as to have the inner faces of the arms at the particular point abutting each other.

In use, after the tractor has been placed in position for operation, it is understood that the front wheel of the tractor is adapted to operate in a furrow previously formed.

Heretofore it has been necessary for the driver of the tractor to continuously have his hands on the steering wheel so as to assure the proper steering of the tractor as the same is moving along the ground when used in plowing or cultivating. By securing the hook 13 on one of the spiders of the steering wheel B of the tractor and placing the looped portion 10 over the hook portion 15 after the furrow wheel has been set in proper position, the steering wheel will be caused to maintain its proper position and will thereby enable the tractor to move along the ground without the necessity of having the operator to steer the same. This will cause the spring 7 to become tensioned and will prevent the possibility of the steering wheel from becoming accidentally turned so as to cause the tractor to go off of its predetermined course.

When the end of the furrow has been reached, the operator grasps the handle 16 and detaches the looped portion 10 from the hook 15 and will thereby enable the steering wheel to again be operated by the operator in the manner seen fit in order to turn the tractor and again cause the same to assume its operative position. It will further be seen that by constructing a steering attachment which can be readily secured in proper position upon the tractor at any suitable point it is not necessary to provide a separate means for receiving and supporting the steering means as the same can readily hand in its supported position and will be out of the way when the operator is steering the tractor with his hands.

The simplicity of my device enables the same to be readily and quickly placed in an operative position and furthermore will be positive in its action. The spring will furthermore cause the tension to be placed upon the steering rod and keep the steering wheel from wobbling and also keep the wheel flush against the wall side of the furrow thus insuring a straight furrow when plowing.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:

1. In combination with a vehicle including a steering wheel and a dash frame; of a supporting clamp of substantially U-shaped design, one arm being of greater length than the other, said U-shaped clamp being engaged with said dash frame and the arms thereof provided with registering openings, means engaging the dash frame and registering openings to secure the clamp in position, the longer arm of said clamp being provided with an additional opening, a second clamping element comprising a base plate having an angular hook-like projection formed thereon, said base plate being applied to one face of the spider on said steering wheel, an upper plate applied to the upper face of the spider on said steering wheel, said base and upper plates being provided with registering openings, means engaging the openings of said plates for securing the clamping element to the wheel, and a retractable spring engaged at its one end with the opening in the longer arm of the U-shaped clamp and at its opposite end with the hook-like projection on the clamping element, as and for the purposes described.

2. In combination with a vehicle including a steering wheel and a dash frame; of a supporting clamp of substantially U-shaped design, one arm being of greater length than the other, said U-shaped clamp being engaged with said dash frame and the arms thereof provided with registering openings, means engaging the dash frame and registering openings to secure the clamp in position, the longer arm of said clamp being provided with an additional opening, a second clamping element comprising a base plate having an angular hook-like projection formed thereon, said base plate being applied to one face of the spider on said steering wheel, an upper plate applied to the upper face of the spider on said steering wheel, said base and upper plates being provided with registering openings, means engaging the openings of said plates for securing the clamping element to the wheel, a retractable spring engaged at its one end with the opening in the longer arm of the U-shaped plate, a loop formed at the opposite end of said spring adapted for engagement with the hook-like projection on the base plate of said clamping element, said loop being pinched at its base, and a handle member engaged with the pinched portion of said loop, as and for the purposes described.

In testimony whereof I affix my signature.

RICHARD T. STRANGE, Jr.